United States Patent
Miller

(10) Patent No.: US 7,492,148 B2
(45) Date of Patent: Feb. 17, 2009

(54) CIRCUIT CONFIGURATION FOR INDUCTIVE DISPLACEMENT MEASUREMENT

(75) Inventor: Bernhard Miller, Weil der Stadt (DE)

(73) Assignee: Knorr-Bremse Systeme für Nutzfahrzeuge GmbH, München (DE)

( * ) Notice: Subject to any disclaimer, the term of this patent is extended or adjusted under 35 U.S.C. 154(b) by 138 days.

(21) Appl. No.: 10/575,659

(22) PCT Filed: Oct. 15, 2004

(86) PCT No.: PCT/EP2004/011634
§ 371 (c)(1),
(2), (4) Date: May 11, 2007

(87) PCT Pub. No.: WO2005/036102
PCT Pub. Date: Apr. 21, 2005

(65) Prior Publication Data
US 2007/0222461 A1 Sep. 27, 2007

(30) Foreign Application Priority Data
Oct. 17, 2003 (DE) .................. 103 48 343

(51) Int. Cl.
*G01B 7/14* (2006.01)
*H01F 5/04* (2006.01)
(52) U.S. Cl. ............................................. 324/207.15
(58) Field of Classification Search ............ 324/207.11, 324/207.12, 207.14, 207.15, 207.16, 207.24, 324/207.25, 207.26, 654, 656; 327/510
See application file for complete search history.

(56) References Cited

U.S. PATENT DOCUMENTS

| 6,541,961 B1 | 4/2003 | Max ....................... 324/207.16 |
| 2003/0098686 A1 | 5/2003 | Mednikov et al. |
| 2004/0201376 A1 | 10/2004 | Kleine et al. ........... 324/207.16 |

FOREIGN PATENT DOCUMENTS

| DE | 102 43 631 | 4/2003 |
| FR | 2 468 884 | 5/1981 |
| GB | 2 062 254 | 5/1981 |

OTHER PUBLICATIONS

Translation of International Preliminary Report on Patentability, Aug. 3, 2006, from PCT International Patent Application No. PCT/EP2004/011634, filed Oct. 15, 2004.

*Primary Examiner*—Kenneth J Whittington
(74) *Attorney, Agent, or Firm*—Kenyon & Kenyon LLP

(57) ABSTRACT

A circuit configuration for inductive displacement measurement using a sensor whose inductance changes as a function of the displacement to be measured, and having an evaluation circuit to which the sensor is connected. The sensor is connected between a first operational amplifier and a series connection of a second operational amplifier and a resistor. The first operational amplifier is switchable over between two specified voltages and the second operational amplifier is operable to adjust a specified constant voltage at the connecting point between the resistor and the sensor, and the output of the second operational amplifier is connected to an input of a comparator whose other input is switchable over between two specified voltages. The output signal of the comparator effecting the switchover of these voltages and the voltages of the first operational amplifier, and is the measuring output signal of the circuit configuration at the same time.

8 Claims, 3 Drawing Sheets

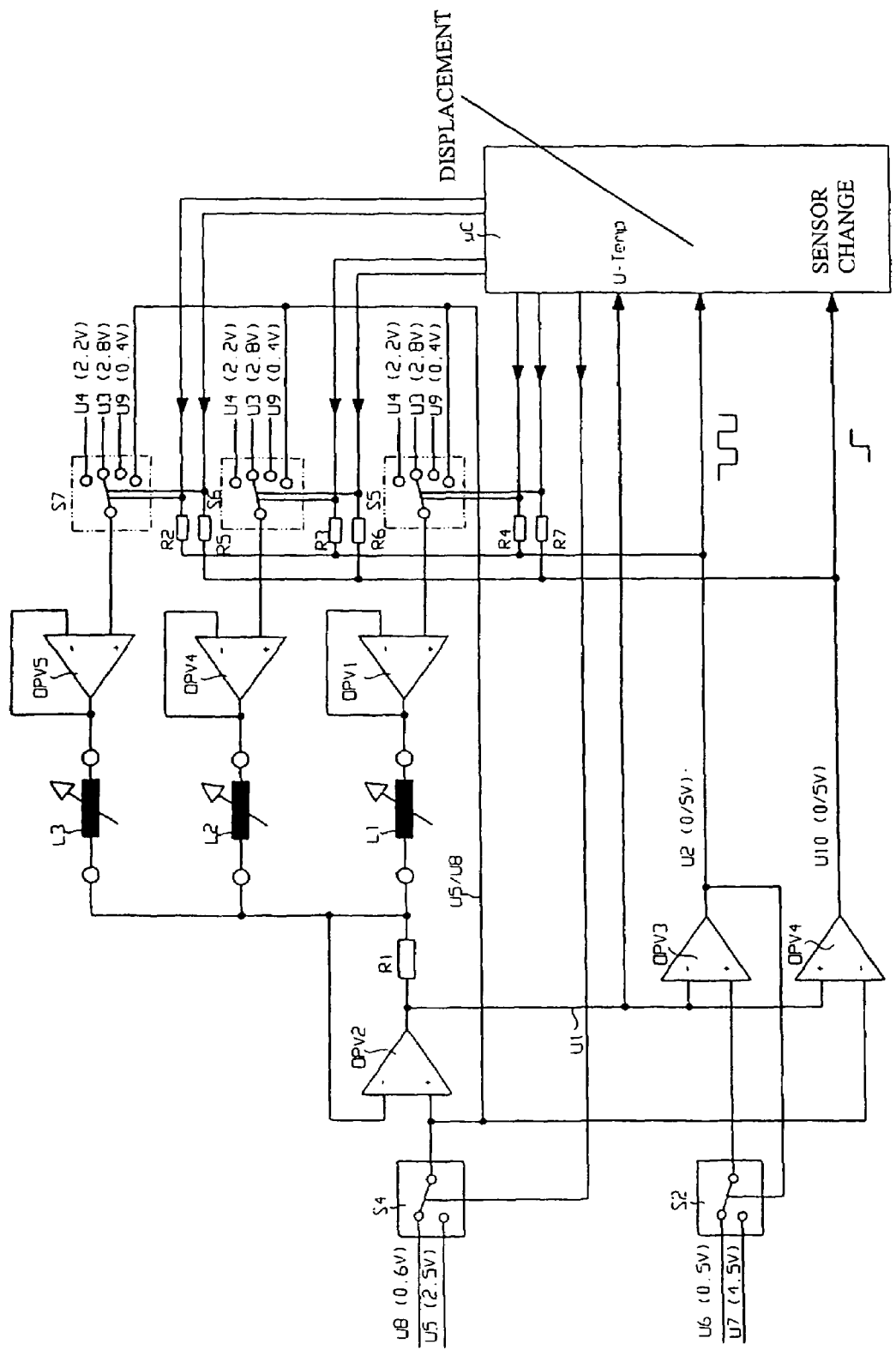

CIRCUIT CONFIGURATION FOR INDUCTIVE DISPLACEMENT MEASUREMENT

FIELD OF THE INVENTION

The present invention relates to a circuit configuration for inductive displacement measurement.

BACKGROUND INFORMATION

Inductive displacement sensors are used for displacement measurement in motor vehicles, which are made up of an induction coil having two terminals and a soft magnetic armature which is displaceable in the induction coil. Thus, the inductance of the coil is a function of the setting of the armature relative to the coil, so that such sensors are suitable for displacement measurement. Such sensors are frequently used in automotive technology, since they are cost-effective to manufacture and are very robust to environmental influences, such as temperature change, stresses from shaking or soiling. Compared to other sensors, such as potentiometers, Hall sensors or optical sensors, the signal processing may be slightly more costly, and problems come about at greater requirements on the stability with regard to temperature-dependent signal aliasing.

The evaluation of such inductive sensors up to now has been made by applying a current pulse or a voltage pulse to the sensor, and by concluding what the current inductivity is with the aid of the step response. The semiconductors and capacitors used for the control of the sensors in many circuits demonstrate a temperature-dependent error, which deteriorates the sensor signal. Also, voltage peaks occur during the switching off of the sensor, which have to be limited using additional anti-surge diodes, in order to avoid damage at other circuit elements. Since the copper line of the sensor coils has a temperature-dependent Ohmic resistance, at higher demands on the signal stability, this Ohmic resistance, and therewith indirectly the temperature of the sensor has to be recorded and drawn upon for error correction. Therefore, in practice, inductive displacement sensors are used only for measurements having low resolution and stability.

SUMMARY OF THE INVENTION

Using the exemplary embodiment and/or exemplary method of the present invention, the above-described disadvantages in the signal conditioning of an inductive measuring sensor are intended to be removed or minimized.

Therefore, it is the object of the exemplary embodiment and/or exemplary method of the present invention to improve the circuit configuration of the type named at the outset in the direction that it works in a stable manner having a high resolution capability, using a simple construction. In particular, no rapid voltage changes or switch-off voltage peaks are to occur. Temperature-dependent errors are also to be avoided or compensated for, to the greatest extent possible.

This objective is achieved by the features indicated in claim 1. Advantageous embodiments and developments of the exemplary embodiment and/or exemplary method of the present invention can be gathered from the subclaims.

The fundamental principle of the exemplary embodiment and/or exemplary method of the present invention is operating the sensor in a self-oscillating oscillator circuit, in which the current flows through the sensor coil, alternatingly in one and the other direction. The oscillator frequency setting in this context is a measure for the inductance of the sensor and thus a measure for the displacement to be measured. In one exemplary embodiment of the present invention, the sensor is connected between two operational amplifiers, of which one is connected as a unity-gain amplifier and regulates a constant reference voltage at the one terminal of the sensor. The other operational amplifier is alternatingly switched over between two voltages, of which one is greater and the other is lower than the reference voltage mentioned. In that way, the coil of the sensor is alternatingly charged and discharged using the voltage difference. The switching over of the two voltages mentioned takes place in response to the reaching of predefined switching thresholds by an operational amplifier, connected as a comparator, whose comparison input is also able to be switched over between two specified reference voltages, so that this comparator continuously assumes stable switching states.

According to an exemplary embodiment of the present invention, the temperature of the sensor is measured indirectly by evaluating the Ohmic resistance of the sensor coil. For this purpose, a constant but different voltage is applied to the coil respectively via the two operational amplifiers, and the current that comes about after a "saturation time" is measured as a voltage drop at a resistor, whereby the temperature of the sensor may be derived and a temperature-dependent error correction may be carried out.

According to another exemplary embodiment of the present invention, a plurality of sensors of the type described may also be used, while using essential elements of the circuit configuration, the individual sensors being singly scanned, for instance, in a cyclical sequence. The temperature of the individual sensors may also be scanned, using the same component parts.

BRIEF DESCRIPTION OF THE DRAWINGS

FIG. 3 shows a circuit diagram of an exemplary embodiment in which a plurality of sensors may be alternatingly read in.

DETAILED DESCRIPTION

Figure 1:
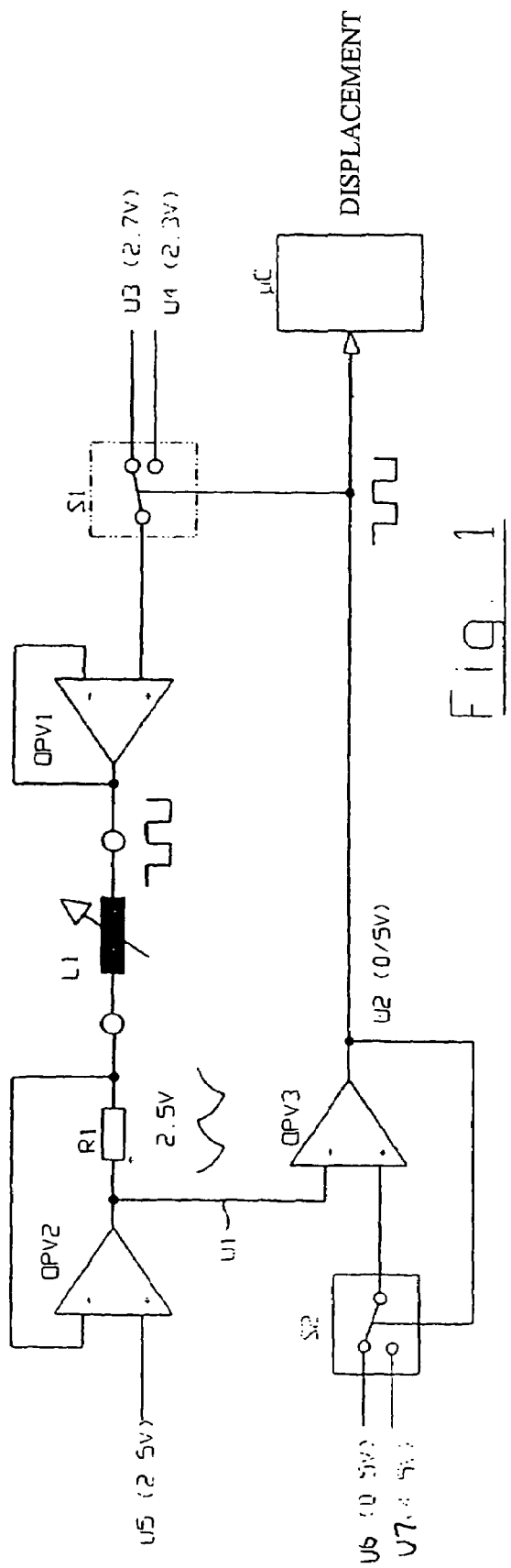
FIG. 1 shows a circuit diagram of the circuit configuration according to an exemplary embodiment of the present invention.

In FIG. 1, an inductive sensor L1 changes its inductance in a known way by displacing an armature in a so-called moving coil, so that such sensors are frequently used for displacement measurement or position measurement. A terminal of sensor L1 is connected to an output of a first operational amplifier OPV1, and its other terminal is connected to a second operational amplifier OPV2 via a resistor R1. The output of second operational amplifier OPV2, at which a voltage U1 appears, is connected to an input of a third operational amplifier OPV3, at whose output a second voltage U2 appears. The output of first operational amplifier OPV1 is directly fed back to its minus input, and therefore has the function of a unity-gain amplifier. The common connecting point between sensor L1 is connected to the minus input of the second operational amplifier OPV2. The plus input of first operational amplifier OPV1 is optionally connected via a controllable switch S1 to two specified, different voltages U3 and U4, that are, for instance, 2.7 V and 2.3 V. The control input of switch S1 is connected to the output of third operational amplifier OPV3.

At the plus input of second operational amplifier OPV2 there is a fifth voltage V5, which is, for instance, 2.5 V. The plus input of third operational amplifier OPV 3 is optionally able to be connected via a second switch S2 to two specified reference voltages U6 and U7, which amount to, for instance, 0.5 V and 4.5 V. The output of third operational amplifier OPV 3 is also the signal output corresponding to the measured variable, and which is supplied, for example, to a microprocessor.

The method of operation of the circuit is described in the following. Sensor L1, whose inductance changes as a function of the displacement to be measured, lies between the two operational amplifier outputs OPV1 and OPV2. First operational amplifier OPV 1 that is used as a unity-gain amplifier is optionally switched over via switch S1 between the two analog voltages U3 and U4. Operational amplifier OPV 2 is connected in such a way that it permanently adjusts the output voltage, fed back at its positive input, which corresponds to the input voltage U5, to sensor L1. In this context, a voltage falls off over resistor R1 which corresponds to the current flowing through sensor L1. Since second operational amplifier OPV 2 constantly adjusts a constant voltage on the side of resistor R1, which is connected to sensor L1, at the other terminal of resistor R1, which is connected to the output of operational amplifier OPV 2, there is created an absolute output voltage U1, which is equivalent to the current flowing through sensor L1. The maximum desired current through sensor L1 may be set by the appropriate dimensioning of R1. That being the case, at the left terminal of resistor R1, which is connected to the output of operational amplifier OPV 2, the fully amplified output amplitude U1 is already available.

Now, if voltage U3 of, for instance, 2.7 V is applied to operational amplifier OPV 1 via switch S1, this voltage is transmitted to the output of operational amplifier OPV 1. Since sensor L1 is constantly being held to voltage U5 of, for instance, 2.5 V at the other terminal by second operational amplifier OPV 2, a magnetic field builds up in the inductance of sensor L1, and the current through sensor L1, that was originally low, keeps constantly increasing, which results in an ever lower output voltage U1. This voltage U1 is passed on to the negative input of third operational amplifier OPV 3, that is being operated as a comparator. At the positive input of third operational amplifier OPV 3, constant voltage U6 is present, which is 0.5 V here, controlled by analog switch S2. The output voltage of third operational amplifier OPV3 is thus close to 0 V, since the negative input is higher than the reference variable U6. Now, if voltage U1 at the input of third operational amplifier OPV3 falls below this value of U6, operational amplifier OPV3 switches over, and at the output supplies a voltage which is essentially equivalent to its operating voltage, and which is here approximately 5 V.

Using this output voltage U2 of third operational amplifier OPV3, analog switch S2 is switched over, and with that, at the same time, it supplies to operational amplifier OPV3 a new setpoint value of U7, which is 4.5 V, in this instance. Thus, operational amplifier OPV3, that is operated as a comparator, remains stable in its output setting, since the new setpoint value is now substantially greater than the instantaneous value at its negative input. At the same time, operational amplifier OPV3 switches over analog switch S1, so that now operational amplifier OPV1 applies a new voltage value of U4, via switch S1, to the right side of sensor L1. Because of that, the inductance of sensor L1 begins to discharge, which results in a reduction of the coil current, and thus an increase in output voltage U1. The coil current falls off down to its zero point, which corresponds to an output voltage U1 of 2.5 V. Now, the coil begins equally to charge up in the positive direction. The initially low current increases continually, until output voltage U1 exceeds the limit of U7 (e.g. 4.5 V). Because of that, operational amplifier OPV3 in turn switches over, and now again supplies its minimum output voltage U2 of almost 0 V. Consequently, a self-oscillating oscillator is created, whose periodicity is a function of the inductance of sensor L1.

Since first operational amplifier OPV1 is operated as a pure unity-gain amplifier only with amplification 1, it is in a position to switch over rapidly and precisely between the two setpoint voltages U3 and U4. Second operational amplifier OPV2 does not have to adjust any rapid voltage changes, and thus it may also be regarded as a relatively ideally performing component. Because of the high Ohmicity of the inputs of the two operational amplifiers OPV1 and OPV3, no interfering voltage drops are created at any changeover switch S1 and S2, so that they are also able to pass on almost error-free signal levels. As is well known, analog changeover switches have very short switchover times, which are of an order of magnitude of a few nanoseconds. Besides these described components, only resistor R1 is still required. This provides for obtaining a very precisely functioning oscillator circuit with respect to sensor L1. Because of the oscillating operating method without rapid switching off of the inductance of sensor L1, no interfering switching-off voltage peaks are created in the inductance, in contrast to evaluation circuits that have been used up to now.

In order to magnify the signal resolution during reading in into a μC, the square-wave voltage appearing at the output of third operational amplifier OPV3 is able to be reduced in its frequency by a postconnected operations counter, at whose output a great time of oscillation is obtained. Consequently, using a timer in a microcontroller μC, the measured displacement information may be read in having a high resolution. Even after subtraction of the minimum from the maximum time of oscillation, this provides for recording a displacement signal having a resolution such as 12 to 14 bits. Some microcontrollers already have such counters or frequency dividers, so that even at high oscillator frequency a great signal resolution may be achieved, without additional component parts. This may also be achieved by suitable software, by interrupt-driven adding in and accumulating the individual times of oscillation.

Figure 2:
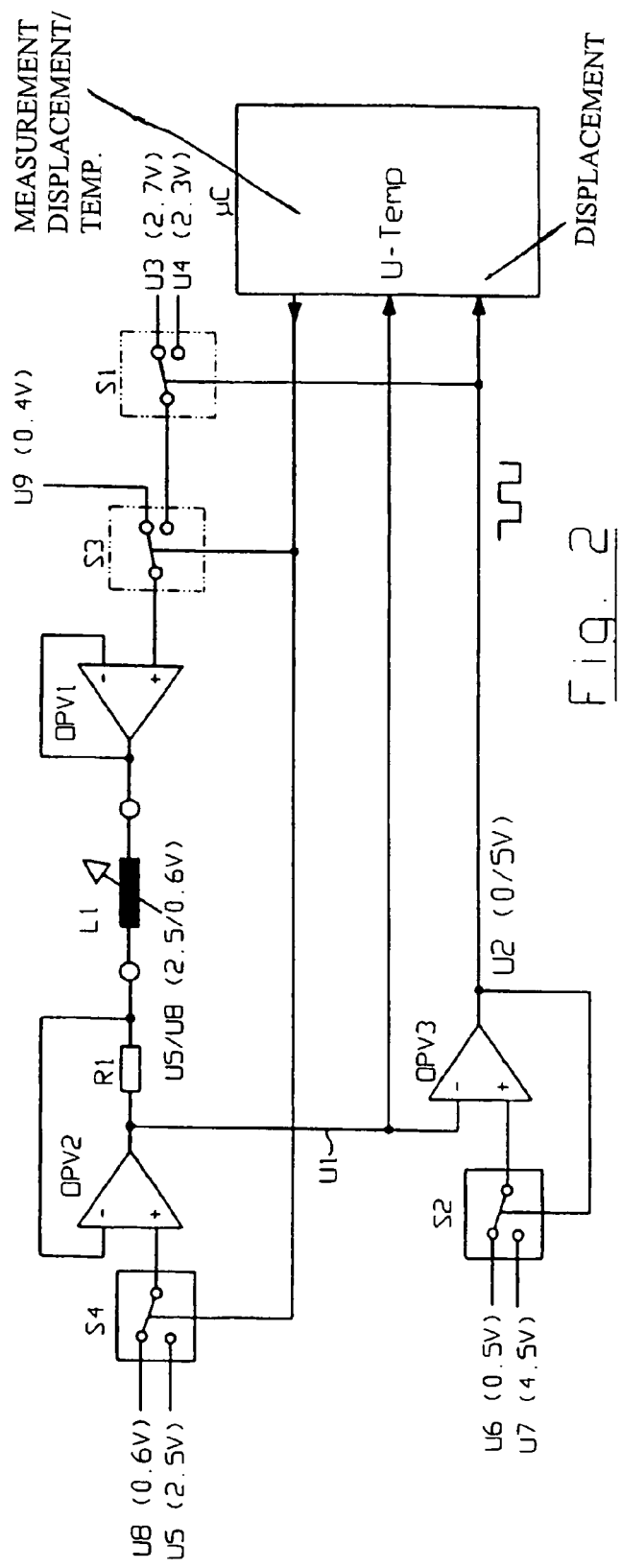
FIG. 2 shows a circuit diagram similar to the one in FIG. 1, supplementarily having the feature of recording a temperature.

In the exemplary embodiment of FIG. 2, sensor L1 is connected in the same way to resistor R1 as in the exemplary embodiment of FIG. 1, between the two operational amplifiers OPV1 and OPV2. However, by contrast, the circuit of FIG. 2 offers the additional possibility of measuring the temperature of sensor L1, in order to compensate for temperature-dependent errors. Generally, the circuit of FIG. 2 operates in such a way that the change in the Ohmic resistance of sensor L1 is measured, which is independent of the displacement and depends only on the temperature. For this purpose, two additional switches S3 and S4 are provided. Using switch S3, a low voltage U9 of, for instance 0.4 V is optionally supplied to first operational amplifier OPV1, or the output voltage of switch S1 having voltages U3 and U4, which, in the exemplary embodiment shown here, amount to 2.7 V and 2.3 V. Via switch S4, a voltage U5 or U8 is optionally supplied to second operational amplifier OPV2, U5 being equivalent to the voltage value of the example in FIG. 1, and U8 being smaller and amounting here, for example, to 0.6 V. The control inputs of switches S3 and S4 are controlled in common by a microcontroller μC. Switchover between displacement measurement and a temperature measurement is made by a signal to switch over switches S3 and S4.

The displacement measurement takes place in the same way as in the exemplary embodiment of FIG. 1, and therefore does not have to be described any more. In the case of the temperature measurement, a constant voltage is set on both sides of sensor L1, until the coil current reaches its maximum value, and so that, via its voltage drop, the Ohmic internal resistance of sensor L1 is able to be read off in the form of voltage U1 and to be supplied to an analog input of a microcontroller. The output voltage of first operational amplifier OPV1 is, in this context, set to the low voltage U9, without endangering its controllability. Voltage U8 that is adjusted by the second operational amplifier is also selected to be low, and is only slightly higher than voltage U9 (here ca. 0.6V), so that, at a maximum temperature of sensor L1 and a given resistance value R1, the analog output voltage U1 is still within the maximum valid voltage value of operational amplifier OPV2 and the analog computer input. If a microcontroller is used for the evaluation circuit, which has a fixed program memory (such as an EEPROM or flash), at the end of the manufacturing process a temperature offset value may be stored in the computer, and thereby the temperature signal may be recorded even more accurately. The temperature measurement takes place alternatingly with the displacement measurement, by a control signal at the control inputs of switches S3 and S4.

Using the circuit of FIG. 3, a plurality of sensors L1, L2 and L3 may be read in while co-using already existing circuit parts, such as operational amplifiers OPV2 and OPV3, resistor R1 and switches S2 and S4, the number of sensors being extendable at will. All the sensors L1 to L3, are connected using their one terminal, in common, to resistor R1, and using their other terminal to a respectively assigned operational amplifier OPV1, OPV4 or OPV5, whose negative input is connected directly to the output. The positive inputs of operational amplifier OPV1, OPV4 and OPV5 are connected to assigned switches S5, S6 or S7, which in each case have four possible settings. In three of these possible settings, their outputs, and thus the inputs of operational amplifier OPV1, OPV4 and OPV5 are connected respectively to one of the specified reference voltages U3, U4 or U9.

In the fourth setting they are connected to the positive input of operational amplifier OPV2, so that in this setting, the same voltage is present at both sides of the respective sensor L1, L2 or L3, so that no current is fed into the node between resistor R1 and sensors L1, L2 and L3. With that, each respective sensor is deactivated. The setpoint voltage present between switch S4 and operational amplifier OPV2 is thereby applied via analog switches S5, S6 and S7 to the other side of all the sensors L1, L2 and L3 that are not used. In order to ensure that the respectively non-activated sensors L1, L2 or L3 are completely discharged before they are deactivated, an operational amplifier OPV4 connected as a comparator is provided, which is connected in such a way that its switching voltage is reached exactly when the same voltage level is present on both sides of resistor R1.

This is only the case when there is no current flowing through R1, that is, when there is no voltage drop at R1. Thus, operational amplifier OPV4 generates an edge (slope) change at the output, using its output voltage U10, exactly when the sensor is completely discharged. This achieves that, exactly at this moment, one of the selected switches S5, S6 or S7 of the respectively active sensor passes on its input voltage (U5) to the respective operational amplifier OPV1, OPV5 or OPV4. Then there continues to be no more current flowing through the sensor that was previously completely discharged. Voltage U10 may also be read into the microcontroller, triggered by the edge, and then to have the microcontroller activate switches S5 to S7. However, the procedure goes faster if, as shown in FIG. 3, operational amplifier OPV4 directly operates switches S5, S6 or S7 via resistors R5, R6 or R7, since a sensor is thus able to be switched off with a minimum time delay. This also ensures that the sensor to be switched off is rapidly and absolutely completely discharged, and is deactivated by the same voltage at both its terminals. Consequently, the microcontroller is not needed for rapidly switching off the sensors.

The control of switches S5, S6 and S7 and also S4 may take place via a control signal from microcontroller μC, which emits the signals in such a way that in each case only one sensor L1 or L2 or L3 is evaluated. The control lines from microcontroller μC to switches S5, S6, S7 are connected via assigned resistors R2, R3 or R4 to the output of operational amplifier OPV3, which achieves that voltage U2, which originates from operational amplifier OPV3, can be overwritten by the microprocessor addressing.

In the same way, resistors R5, R6 and R7 are also used so that the voltage U10, originating with operational amplifier OPV4, can be overwritten by the microprocessor addressing.

The temperature recording described in connection with FIG. 2 is carried out in the same manner, the activation of the temperature recording being also initiated by microcontroller μC; here too it being ensured that in each case only the temperature of one selected sensor is recorded.

In summary, using the exemplary embodiment and/or exemplary method of the present invention, one arrives at the following advantages:

high accuracy and stability of an inductively recorded displacement signal;

lower material costs;

high stability of the oscillator, since the components used are operated almost ideally;

no interfering switch-off voltages at the sensor coil;

simple signal amplification;

controlling of the sensor coil using oscillating alternating voltage, so that both negative and positive coil charges are able to be used;

great signal resolution having, for instance, 16-bit signal width;

also, evaluation of oscillation frequencies by frequency dividers;

other than OPV, no other frequency-dependent components;

no transient oscillation lag time of the oscillator, which is particularly important after the return of a measurement of the sensor temperature;

simple application of the circuit;

equally optimal utilization of the operating range of the operational amplifiers for inductance recording and temperature recording.

What is claimed is:

1. A circuit configuration for inductive displacement measurement, comprising:

a sensor whose inductance changes as a function of a displacement to be measured; and an evaluation circuit coupled to the sensor;

wherein:

the sensor is coupled between a first operational amplifier and a series connection of a second operational amplifier and a resistor, the first operational amplifier is switchable between a first set of two specified voltages and the second operational amplifier is operable to adjust a specified constant voltage at a connecting point between the resistor and the sensor, an output of the second operational amplifier is connected to an input of a comparator whose other input is switchable between a second set of two specified voltages, and the output signal of the comparator effects the switchover of the second set of two specified voltages and the first set of two specified voltages of the first operational amplifier, and is a measuring output signal of the circuit configuration at the same time.

2. The circuit configuration of claim 1, further comprising: controllable switches, for switching over the first and second sets of specified voltages of the first operational amplifier and of the comparator, the controllable switches having control inputs which are respectively connected to the output of the comparator.

3. The circuit configuration of claim 1, wherein an input of the second operational amplifier is coupled to the common connecting point of the resistor and the sensor.

4. The circuit configuration of claim 1, wherein an input of the first operational amplifier is connected to its output.

5. The circuit configuration of claim 1, wherein, for measuring the temperature of the sensor, in each case a constant and different voltage is applied to both terminals of the sensor, and after a constant current through the sensor is achieved, a voltage drop at the resistor is evaluated as a measured variable for a temperature-dependent, Ohmic resistance of the sensor.

6. The circuit configuration of claim 5, wherein, for applying the constant and different voltages, there are controllable switches which are controllable by a microcontroller.

7. The circuit configuration of claim 1, wherein a plurality of sensors are each coupled by one terminal in common to the resistor, and respective other terminals of the sensors are coupled to an assigned operational amplifier, whose one input is coupled in each case to an assigned, controllable switch, which is in each case controllable by a microcontroller, and wherein in each case only one sensor is activated and the remaining sensors are deactivated by a same voltage being applied to both of its terminals.

8. The circuit configuration of claim 1, wherein a plurality of sensors is coupled to one terminal in common to the resistor, and respectively other terminals of the sensors are coupled to an assigned operational amplifier, whose one input is coupled respectively to an assigned, controllable switch, which is controllable by a comparator so that a sensor that is to be deactivated has the same voltage applied at both of its terminals when no current flows through it.

* * * * *